Figure 1:
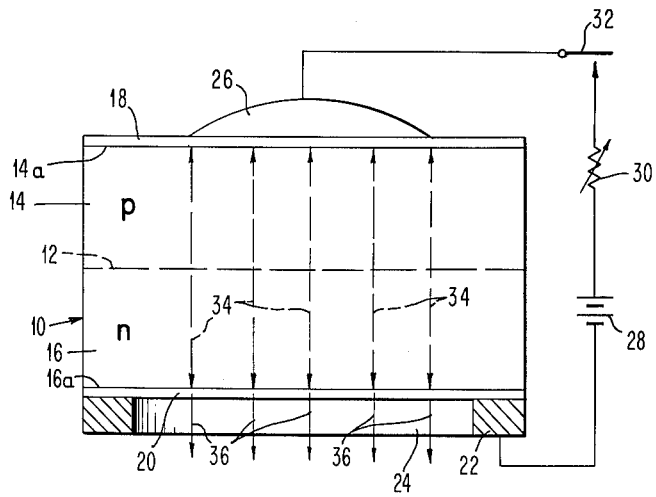

April 26, 1966  W. P. DUMKE ETAL  3,248,669
SEMICONDUCTOR LASER WITH OPTICAL CAVITY
Filed Oct. 30, 1962

INVENTORS
WILLIAM P. DUMKE
RUDOLPH R. HAERING
BY Stephen J. Limanek
ATTORNEY

United States Patent Office 3,248,669
Patented Apr. 26, 1966

3,248,669
SEMICONDUCTOR LASER WITH
OPTICAL CAVITY
William P. Dumke, Chappaqua, and Rudolph R. Haering,
Yorktown Heights, N.Y., assignors to International
Business Machines Corporation, New York, N.Y., a
corporation of New York
Filed Oct. 30, 1962, Ser. No. 234,070
1 Claim. (Cl. 331—94.5)

This invention relates to lasers of the solid state type and more particularly to the stimulated emission of radiation by carrier injection and recombination in a solid state element.

Optical masers or lasers, as the art has developed, generally involve the establishment of an artificial distribution of electrons at energy levels other than the natural distribution in a host environment through the application of a source of energy known as pumping energy. This results in a greater fraction of filled energy states at the higher levels than filled energy states at the lower levels, which condition is known as population inversion. The electrons present in the host environment in the artificial distribution then give up their energy and undergo a transition to a lower energy level. The released energy may be in the form of electromagnetic radiation which in the majority of devices seen thus far in the art has been either visible or infrared electromagnetic radiation.

In optical maser devices currently available in the art, there is employed either a gas, such as a helium-neon mixture or a crystal, such as, aluminium oxide or calcium fluoride, as the host environment, into which is placed appropriate impurities, for example, chromium or trivalent uranium, respectively, which respond to the pumping energy, permitting the population inversion of electrons between an excited state and a lower state of the impurities. The electrons in returning to the lower state of the impurity give off a quanta of light energy or photons in what is known in the art as radiation transition. When the density of these photons becomes large, the radiative transition probability increases, and in the presence of a population inversion, electromagnetic modes into which the photons are emitted, in turn, become more readily able to induce further emission therein. This is known in the art as stimulated emission of radiation and results in a narrowing of the emission line from the device. In the currently available optical maser device, electrical power is converted to optical power, pumping light or an electrical discharge which, in turn, is used to establish the population inversion in the host crystal.

It has been discovered that optical laser action or stimulated emission of radiation can be imparted to a suitable solid state material by injecting carriers at a sufficient rate and permitting those carriers to recombine. When this injection carrier rate is achieved, resulting narrowing of the output light emission line occurs. Stimulated emission of radiation is imparted to a solid state material which has an energy gap and which exhibits a radiative energy transition upon the release of energy by carrier recombination therein by injecting carriers into the solid state material in a density sufficient to overcome the losses in the solid state environment. More particularly, stimulated emission of radiation has been imparted to a semiconductor device by the fabrication of a "p-n" junction in the device which is appropriately forward biased at a given injected carrier current density sufficiently high to overcome various non-radiative electron recombination and various radiation loss mechanisms in the host semiconductor crystal. When these conditions are satisfied, the light output, as a result of the released energy through recombination of the injected carriers, sharply shifts to a single predominating mode at the expense of all other output modes in the system, as described in more detail in commonly assigned co-pending U.S. patent application Serial No. 230,607, Burns et al., filed October 15, 1962.

It is an object of this invention to provide stimulated emission of radiation in an improved solid state device.

Another object of this invention is to provide an improved coherent light emitting solid state structure.

A further object of this invention is to provide a solid state structure emitting light in a preferred optical mode.

Yet a further object of this invention is to provide an improved injection laser.

Yet another object of this invention is to provide an improved solid state device exhibiting a sharp narrowing of the emission line width for injected carrier density values having lower threshold density.

Still a further object of this invention is to provide a coherent light emitting semiconductor structure having a geometrical configuration which enhances the emission of a preferred optical mode.

Still another object of this invention is to provide a coherent light emitting semiconductor structure having a lower stimulated emission threshold.

In accordance with the present invention, an improved device exhibiting stimulated emission of radiation is provided which includes a semiconductor crystal having two regions of opposite conductivity type joined at a p-n junction which is disposed between and parallel to a pair of lapped reflective surfaces.

An important advantage of this invention is that an injection laser is provided which has a stimulated emission threshold substantially lower than the threshold of prior injection lasers.

An important feature of the injection laser of the present invention is that it provides a structure which requires less current density to produce a given light intensity and thus produces less undesirable heating in the laser.

The foregoing and other objects, features and advantages of the invention will be apparent from the following more particular description of a preferred embodiment of the invention, as illustrated in the accompanying drawing.

Figure 2:
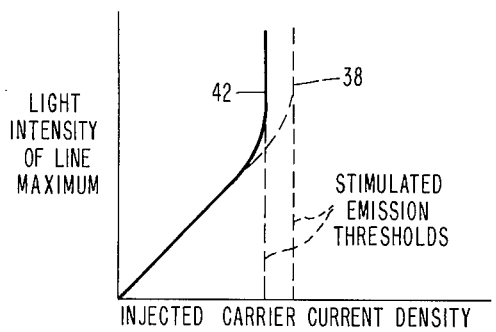
Figure 3:
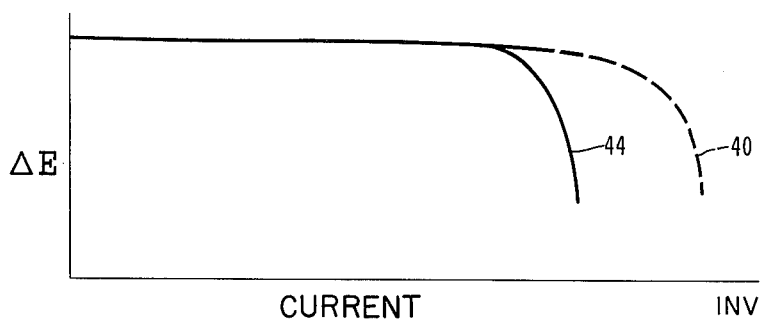

In the drawing:

FIG. 1 shows a cross sectional view of the injection laser of the present invention with connections to a suitable current source, FIG. 2 shows curves of light intensity of line maximum versus injected carrier current density of injection lasers illustrating stimulated emission thresholds, and FIG. 3 shows curves illustrating the narrowing of the band width of light output versus current of injection lasers.

Referring to the drawings in more detail, there is illustrated in FIG. 1 a p-n junction injection semiconductor embodiment of the device of the invention. The device of FIG. 1 is made up of a semiconductor crystal 10 containing a p-n junction 12 separating a "p" region 14 having an optically flat upper surface 14a and an "n" region 16 having an optically flat lower surface 16a. A first thin reflective or coating film 18 is disposed on the upper surface 14a of the "p" region and a second thin reflective film or coating 20 is applied to the lower surface 16a of the "n" region of the device. The device is constructed so as to have the p-n junction essentially parallel to the upper surface 14a of the "p" region and to the lower surface 16a of the "n" region, thus being substantially parallel to each of the first and second thin reflective films 18 and 20. The first reflective film 18 is made so as to reflect the maximum amount of the incident light applied thereto from the "p" region 14 and the second reflective film 20 is made so as to transmit therethrough one to ten percent of the incident light from the "n" region 16 and to reflect as much as possible of the remaining incident light from the "n" region. To perform the desired reflective functions, the first thin reflective film 18 may be fully silvered film covering a desired portion of the upper surface 14a of the "p" region 14 and the second reflective film 20 may be a partially silvered film so as to permit a small portion of the light to pass therethrough.

A first ohmic contact 22 having an aperture 24 therein is electrically connected to the partially silvered film 20 with the aperture 24 serving as an opening to permit light to be radiated from the "n" region 16 through the partially silvered film 16a to any suitable utilizing device. A second ohmic contact 26 is electrically connected to the first reflective film 18. The first and second ohmic contacts 22 and 26 are appropriately connected to a power source illustrated as a battery 28, a variable series impedance 30 and a switch 32 which serve to selectivly apply a forward bias to the p-n junction 12 to provide a current density above the threshold current density of the device illustrated.

In the operation of the device illustrated in FIG. 1 of the drawing, when the switch 32 is closed photons are generated by the injected carriers, as described in the above-identified U.S. patent application. The photons generated travel from their points of origin in many different directions to emit light, produced by stimulated emission when current density thresholds are exceeded, from the various surfaces of the semiconductor crystal. In accordance with this invention, in order to reduce the stimulated emission current threshold value, to select preferred modes and to provide directional coherent light, the first and second reflective films 18 and 20 are arranged to provide a high "Q" cavity to the photons travelling substantially perpendicularly to these films. Thus, these photons have a longer time in which to induce further emission of similar photons since they are repeatedly reflected by the films 18 and 20, producing standing waves indicated at 34, until they escape through the partially silvered film 20 as output rays 36. The output rays 36 are of high intensity and are uni-directional in character. The modes perpendicular to the reflective films 18 and 20 are highly populated with photons.

The standing waves 34 set up between the two reflective films 18 and 20 have an integral number of wavelengths $n\lambda$ which are equal to the optical path length $2n_0 l$, where $n_0$ is the index of refraction of the crystal and $l$ the separation between the reflective films 18 and 20. The separation between two modes $^\Delta\lambda$ with $n$ and $n+1$ wavelengths can be calculated as follows:

$$n\lambda = (n+1)(\lambda - {^\Delta\lambda}) = 2n_0 l$$

$$n = \frac{2n_0\lambda}{\lambda} \text{ and } 0 = \lambda - n^\Delta\lambda \text{ or } {^\Delta\lambda} = \frac{\lambda}{n}$$

therefore $$^\Delta\lambda = \frac{\lambda^2}{2n_0 l}$$

One of the injection lasers which operated successfully was made of gallium arsenide having a thickness of 7 mils or 175 microns. The index of refraction $n_0$ was 3.33 and the wavelength of the output light was equal to .84 micron. Thus, the calculated mode separation $^\Delta\lambda$ is equal to 6.0 A. and the observed value of the mode separation $^\Delta\lambda$ of the operational injection laser was found to be exactly 6.0 A. also.

It should be understood that the reflective films 18 and 20 in effect, form a geometrically resonant optical cavity for the standing waves 34. Hence, the mode formed by the cavity provides stimulated emission at much lower current density thresholds since most of the energy from the injected carriers will be directed to support this mode.

The current density thresholds for prior injection lasers and for the lasers of the present invention are indicated in FIG. 2 of the drawing. The curve 38 shown in FIG. 2 is a plot of the light intensity of the emitted light line maximum against injected carrier current density in prior injection lasers. It can be seen that this curve 38 is substantially linear at low current densities, but at higher current densities there is an abrupt change in the slope indicating the stimulated emission threshold for the prior injection lasers. It is known that at the threshold there is an abrupt shift in light intensity to a narrow band of intense light and with a further increase in current, the narrow band predominates at the expense of other bands. The narrowing of the band of the prior art injection lasers is indicated in curve 40 of FIG. 3 of the drawing where the emission line width at half height is indicated by $^\Delta E$ which is plotted against current. The stimulated emission threshold of prior art injection lasers was achieved at currents of the order of $10^4$ to $10^5$ amperes per square centimeter. By employing the novel arrangement of the present invention the stimulated emission threshold is reduced considerably as indicated by curve 42 of FIG. 2 of the drawing and thus the resulting narrowing of the band width is achieved at current densities considerably less than $10^4$ amperes per square centimeter as indicated by curve 44 of FIG. 3.

It should be understood that the optically flat parallel surfaces 14a and 16a indicated in FIG. 1 of the drawing may be provided by known grinding and polishing techniques or by cleavage techniques employing a force along the minimum band crystallographic plane of the semiconductor crystal, as described in more detail in co-pending U.S. patent application Serial No. 234,141, "Method of Fabricating Crystalline Shapes," filed by R. Rutz and F. Dill on even date and commonly assigned. The application of the fully and partially silvered films 18 and 20 on the optically smooth surfaces 14a and 16a, respectively, may be made by known evaporation techniques.

It also should be understood that where narrower output lines are desired, the injection laser of the present invention may be operated at cryogenic temperatures, for example, at liquid nitrogen temperature.

While the invention has been particularly shown and described with reference to a preferred embodiment thereof, it will be understood by those skilled in the art that various changes in form and details may be made therein without departing from the spirit and scope of the invention.

What is claimed is:

An injection laser comprising:
  a semiconductor crystal having an upper surface and a lower surface and a p-n junction extending in said crystal essentially parallel to said surfaces,
  first and second electrodes on upper and lower surfaces respectively,
  means coupled to said electrodes to forward bias said junction to produce stimulated emission of radiation in said crystal,
  said upper and lower surfaces being mutually parallel and coated to be optically reflective to provide an opitcal cavity between said upper and lower surfaces resonant for said radiation traveling in a direction between said surfaces essentially perpendicular to said junction,
  one of said surfaces being partially reflective to transmit a portion of the radiation incident therein;
  said electrode on said one surface having an aperture therein to extract said transmitted radiation from said crystal.

References Cited by the Examiner

UNITED STATES PATENTS 3,059,117  10/1962  Boyle et al. _____ 88—61
3,121,203  2/1964  Heywang _____ 88—61

OTHER REFERENCES

Benoit et al.: "Les Semi-Conducteurs et leur Utilisation Possible dans les 'Lasers'," J. Physique et le Radium, volume 22, No. 12, pages 834 to 836.

JEWELL H. PEDERSEN, *Primary Examiner.*

J. L. CHASKIN, R. L. WIBERT, *Assistant Examiners.*